Jan. 24, 1933.　　　　E. MENNILLO　　　　1,895,228
VEHICULAR DWELLING
Filed Oct. 11, 1930　　2 Sheets-Sheet 1
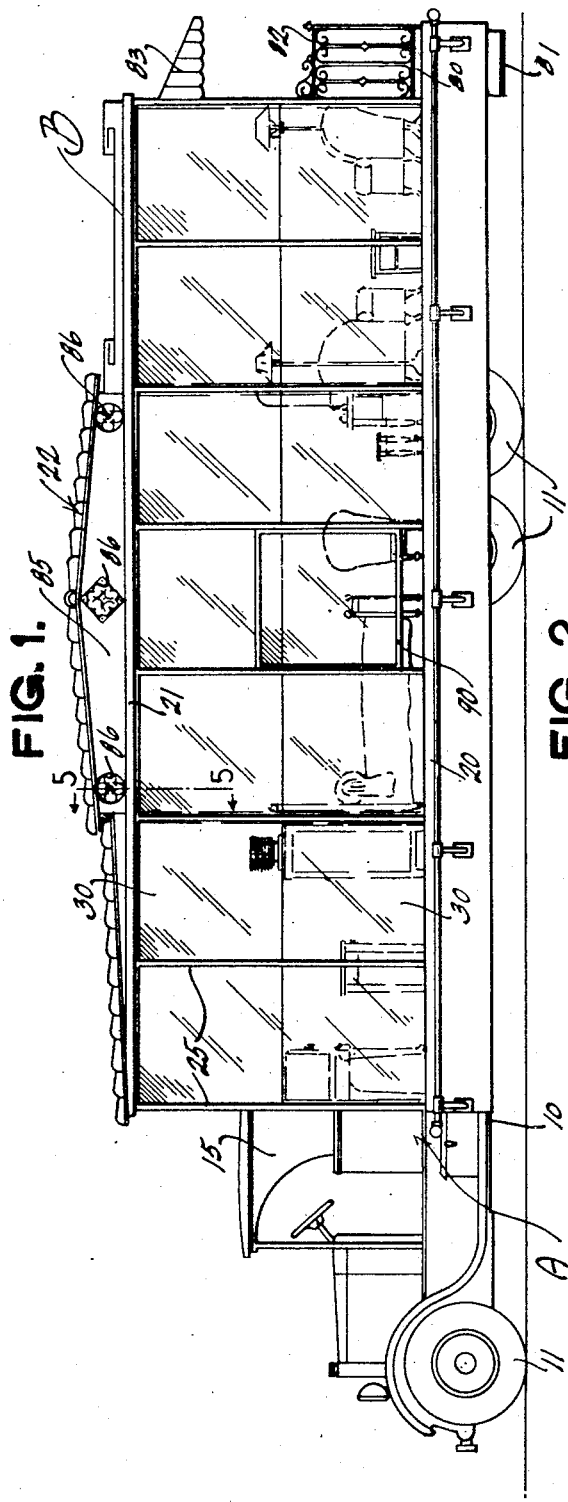
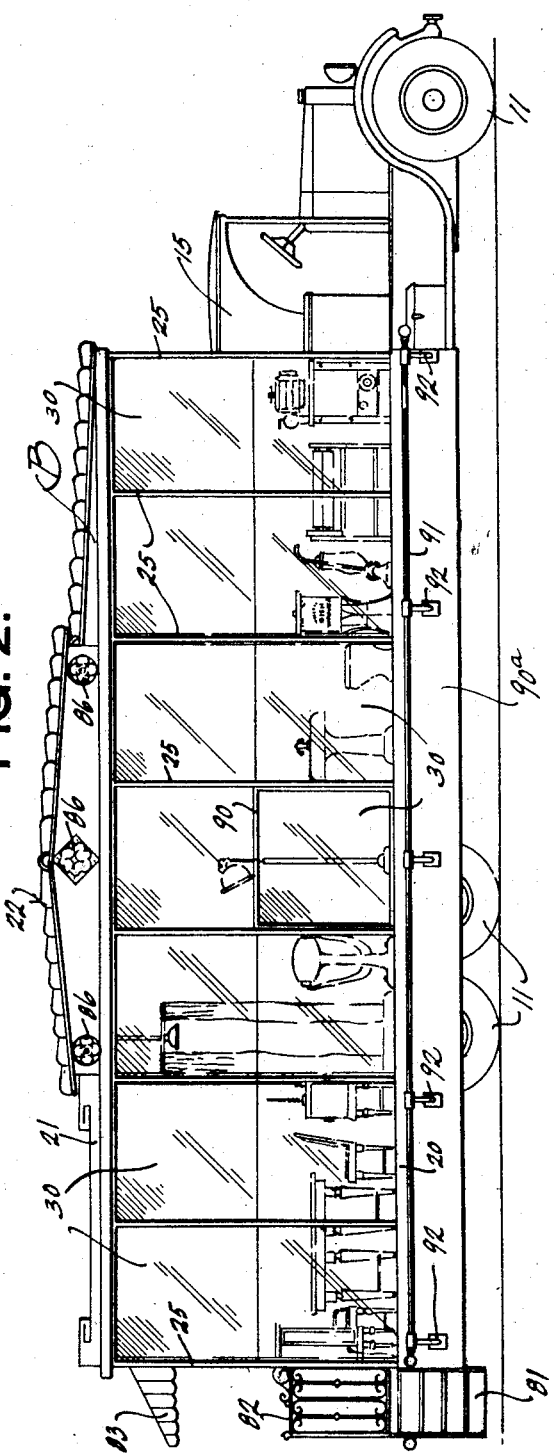
INVENTOR.
Edna Mennillo
BY Lancaster, Allwine and Rommel
ATTORNEYS.

Jan. 24, 1933.  E. MENNILLO  1,895,228
VEHICULAR DWELLING
Filed Oct. 11, 1930  2 Sheets-Sheet 2
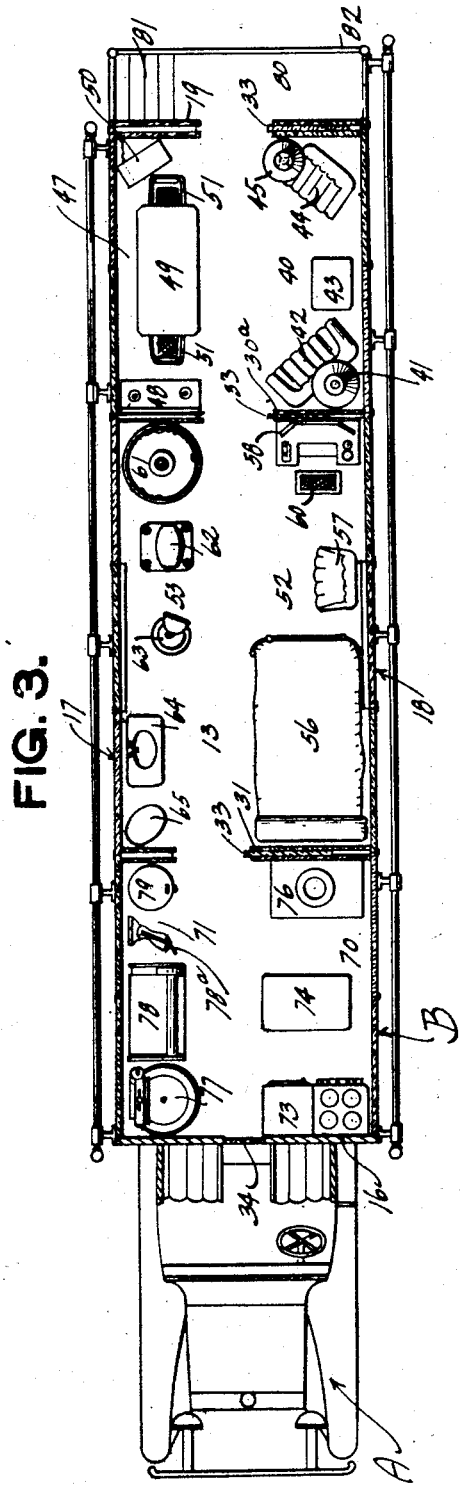
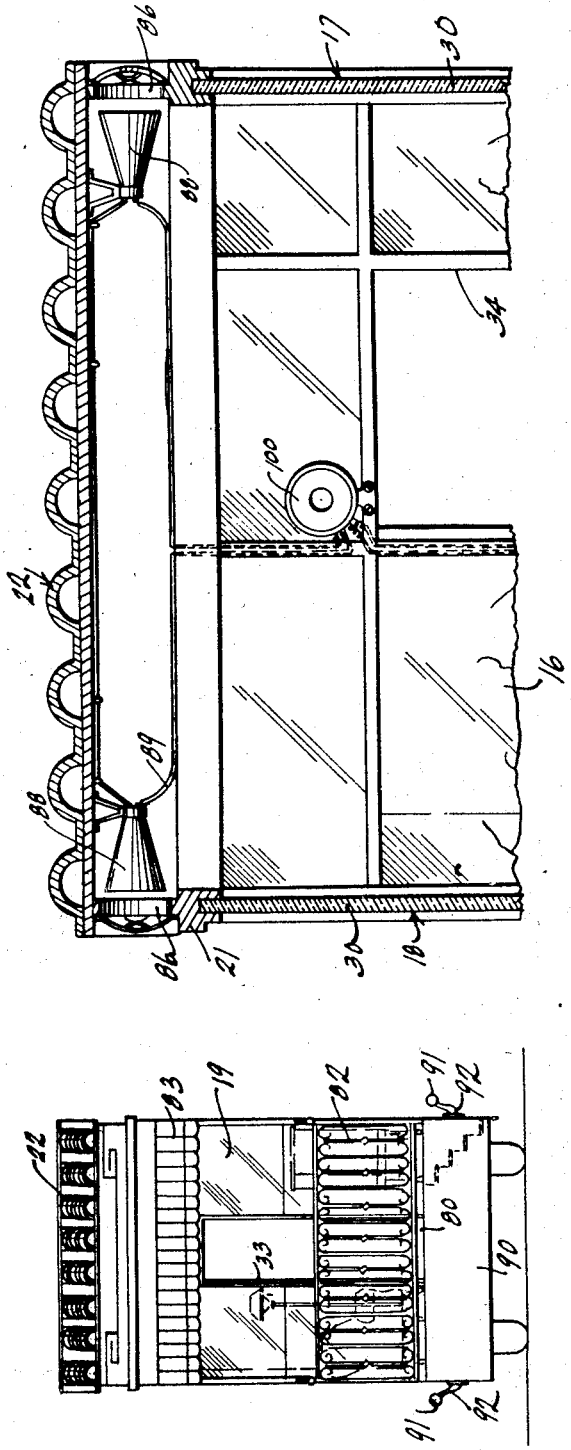
INVENTOR.
Edna Mennillo
BY *Lancaster, Allwine and Rommel*
ATTORNEYS.

Patented Jan. 24, 1933

1,895,228

UNITED STATES PATENT OFFICE

EDNA MENNILLO, OF HOLLYWOOD, CALIFORNIA, ASSIGNOR OF ONE-HALF TO CIRO R. MENNILLO, OF HOLLYWOOD, CALIFORNIA

VEHICULAR DWELLING

Application filed October 11, 1930. Serial No. 488,163.

This invention relates to improvements in apparatus for the display of merchandise and the like.

The primary object of this invention is the provision of a display housing, the walls of which are transparent, and which may or may not be portable; the same being fitted with equipment fully visible to those externally of the housing which will enable a person or persons to live and reside within the housing, and demonstrate therein, to on-lookers, merchandise in the nature of house furnishings, fittings, appliances, wearing apparel, cosmetics, food-stuffs, and the like, in a novel manner; the person residing in the housing utilizing the equipment much in the same manner as an individual would use, and particularly a housewife, in the ordinary course of living.

Other objects and advantages of this invention will be apparent during the course of the following detailed description.

In the accompanying drawings, forming a part of this specification, and wherein similar reference characters designate corresponding parts throughout the several views, Figure 1 is a side elevation of a truck showing the portable display housing and apparatus therein.

Figure 2 is an opposite side view of the portable display apparatus and equipment therein.

Figure 3 is a sectional view taken longitudinally through the upper portion of the housing, showing the plan or lay-out of equipment essential to permit a person or persons to live in the housing with comfort.

Figure 4 is a rear view of the improved display truck, showing an observation platform.

Figure 5 is an enlarged fragmentary sectional view taken through a portion of the housing, substantially on the line 5—5 of Figure 1.

In the drawings, wherein for the purpose of illustration is shown only a preferred embodiment of the invention, the letter A may generally designate a truck chassis, whereon the improved housing B is mounted, and wherein suitable equipment is placed essentially necessary for the living of a person or persons within the housing over a twenty-four hour period, more or less.

The chassis A may include a suitable frame 10 to which front and rear running and steering gear 11 is conventionally connected; the chassis A being of the usual automobile truck type, except that the same is longer than the conventional truck chassis.

The housing B includes the floor or platform 13 mounted upon the frame of the truck chassis, rearwardly of the cabin 15. A front wall 16 is provided, which may be transparent or opaque, and in the present instance is preferably opaque; the relatively long opposed side walls 17 and 18 being substantially entirely transparent, except for the frame portions which hold them in place; and a rear transparent wall structure 19 being provided which is entirely transparent except for the narrow frame holding the same in place.

The frame structure holding the transparent panels of the side and rear walls in place may include lower panel supporting rails 20 and upper panel supporting rails 21; the latter being of a nature to support a superposed roof structure 22. Upright supporting posts 25 are provided, in suitable spaced relation, between the upper and lower rails 20 and 21. The side and rear wall panels, clearly shown in the drawings, may be divided into upper and lower sections 30, preferably of plate glass, and suitably connected in any approved relation to the posts 25 and the upper and lower rails. If desired, these panels may be connected intermediate their upper and lower ends by means of transverse braces between the posts 25, and the entire panel structure may be integral if found to efficiently serve the purpose. It is to be particularly noted that, except for the narrow posts and upper and lower supporting rails, the entire side wall structure from the floor 13 to the roof 22 is transparent and will permit onlookers to see substantially every article of merchandise and equipment in the truck housing from top to bottom, and end to end of the housing.

The interior of the housing is sub-divided into rooms by means of transparent partition walls 30ª and 31. The rear wall 19 and walls 30ª and 31 are preferably constructed of spaced double thicknesses of glass or other transparent material, between which sliding doors 33 of transparent material are arranged, to form part of the respective partition walls, and to slide between the spaced plates forming each of the walls, to provide doorways through which the person or persons living in the housing may pass from one room to another.

The front wall 16, preferably mentioned as being opaque, may be provided with a suitable doorway 34, wherein an enclosure may be provided, as desired.

It is of course to be understood that the walls 19, 30ª and 31 and their closures 33 are of such nature that these walls and doors are transparent throughout the height and width thereof, except for the narrow beading or framing structure necessary to support the same in place. It is to be noted that the doorways are arranged substantially along the longitudinal axis of the truck, to provide an aisle extending longitudinally through the housing B; it being intended that the portions of compartments between the partitions shall represent a room at each side of the aisleway. Thus, as shown for the compartment between the rear wall 19 and the adjacent partition wall 30ª, part of the partition to the left side of the aisleway, designated by numeral 40, may represent a living room, and therein a suitable lamp 41; divan 42; coffee table 43; upholstered chair 44, and lamp 45 may be placed in an orderly room-like and comfort appearing relation, to give the appearance of an ordinary living room; it being understood that other equipment may be used if desired, and that the lamps in any of the parts of the housing may be connected with the source of current in the automobile for illuminating purposes. In this compartment at the opposite side of the aisleway is provided the dining room, designated at 47, wherein a suitable buffet 48; table 49; radio or serving table 50, and suitable chairs 51 may be provided, or any other equipment may be arranged in proper comfort appearing relation.

The compartment between the partitions 30ª and 31, which is the intermediate compartment or room space in the truck housing, is the longest of the room spaces, and at the left side of the aisle therein is provided a bedroom 52, and at the opposite side of the aisle is provided a bathroom 53. In the bedroom 52 may be placed a bed 56; chair 57; dresser 58, and bench 60. In the bathroom suitable and necessary equipment may be provided, such as a shower 61; health motor 62; carbon lamp 63; wash-basin 64; and toilet 65.

In the fore-room space, which is approximately of the same size as the rear room space, there are provided at the left side of the aisle-way a kitchen 70, and at the right side of the aisle-way a laundry 71. The kitchen 70 may have suitable kitchen apparatus therein, such as a range 73; table 74, refrigerator 76 and the like. The laundry-room may have a washing machine 77; ironing machine 78; vacuum cleaner 78ª; and dish-washing machine 79. The latter may be part of the kitchen apparatus if found essential, although it is conveniently located with respect to the kitchen 70 in the arrangement of kitchen and laundry at opposite sides of the aisle-way of the fore-room space.

The floor or platform at the rear end beyond the rear wall 19 is preferably provided with an observation platform 80, which may have lateral steps 81 leading to the ground; this platform being surrounded by a suitable ornamental railing 82 as shown, which is of a nature not to seriously obstruct the view of onlookers into the rear end of the housing, through the transparent rear wall structure, as can readily be understood from Figure 4 of the drawings. If desired, a suitable rear awning 83, over the rear observation platform, may be provided.

The roof structure 22 may be of any approved nature, since it will vary widely, depending upon the character of use of the housing B. In event the housing B is built stationary the roof 22 may be the same as any conventional roof structure, and indeed the rearrangement of rooms may be different than that shown in the drawings. In the present instance, however, the central portion of the roof structure is made to provide an upper compartment above the top side rails 21 wherein suitable side opaque walls 85 may be provided with ventilating openings 86 having fans or any approved ventilating screening if desired. In facing relation with these openings 86 loud speakers or amplifiers 88 may be provided, and which may be suitably connected with microphones 100 located in the various rooms, or it may be that the amplifying apparatus is of such nature that the loud speakers 88 do not have to be connected with suitable microphones. In the preferred instance, however, the electrical apparatus of the amplifiers 88 are suitably connected by wiring 89 with small microphones which may be placed in the various rooms.

In order to secure proper ventilation, and for purposes of ready access for insertion and removal of equipment, it is preferred to provide a lower sash 90 on each of the side walls of the truck, of a slidable nature, which may be elevated and lowered as shown in Figures 1 and 2 of the drawings.

While the truck wall 16 of the specific embodiment of the invention is shown as opaque, yet it is to be distinctly understood that it may be of transparent material, and actually will be in cases where the casing is stationary and not portably mounted upon a truck chassis.

The demonstrating or displaying is preferably done by an expert, preferably a young woman, or the demonstration may contemplate the living of an entire family in the compartment or housing. The equipment and arrangement of rooms is of such nature that the demonstrator may continue a demonstration for twenty-four hours, more or less, having all necessities for comfortable living.

If desired, suitable screens or blinds may be located at the railings 21 of the side, front and rear walls, which may be drawn if it is desired to have secrecy during any portion of the demonstration, or if it is desired to close off the demonstration at any period. The curtains, shades, or blinds may be of any approved nature, although it is preferred to have inside ruffled window shades.

The truck has a mud skirt 90ª surrounding the same, and guard railings 91, which may be collapsibly supported by hinged brackets 92.

Various changes in the shape, size, and arrangement of parts and the use of the transparent display housing or portable stationary apparatus may be made without departing from the spirit of the invention or the scope of the claims.

I claim:

1. In display apparatus of the class described, an elongate housing having a floor, transparent side walls and at least one transparent end wall, and partitions, transparent from the floor upwardly, provided with door openings and transparent closures for the openings, whereby household furniture and the like and operations performed within said housing may be viewed from various points without the housing at opposite sides and end thereof and thru said partitions.

2. In display apparatus of the class described, an elongate housing having a floor, transparent side walls and at least one transparent end wall, and partitions, wholly of substantially transparent material extending from the floor upwardly and substantially the same height as the side walls, said partitions provided with door openings and substantially transparent closures for the openings, whereby household furniture and the like and operations performed within said housing may be viewed from various points without the housing at opposite sides and end thereof and thru said partitions.

3. In display apparatus of the class described, an elongate housing having a floor, transparent side walls and at least one transparent end wall, one of said side walls provided with an opening extending upwardly from the floor of the housing, a transparent removable closure for the opening, and a guard rail disposed alongside said housing below the floor level and close adjacent the lower end of said opening, whereby said rail in addition to its ordinary function, will provide a means to guide and support articles inserted through said opening.

EDNA MENNILLO.